United States Patent Office 3,291,963
Patented Dec. 13, 1966

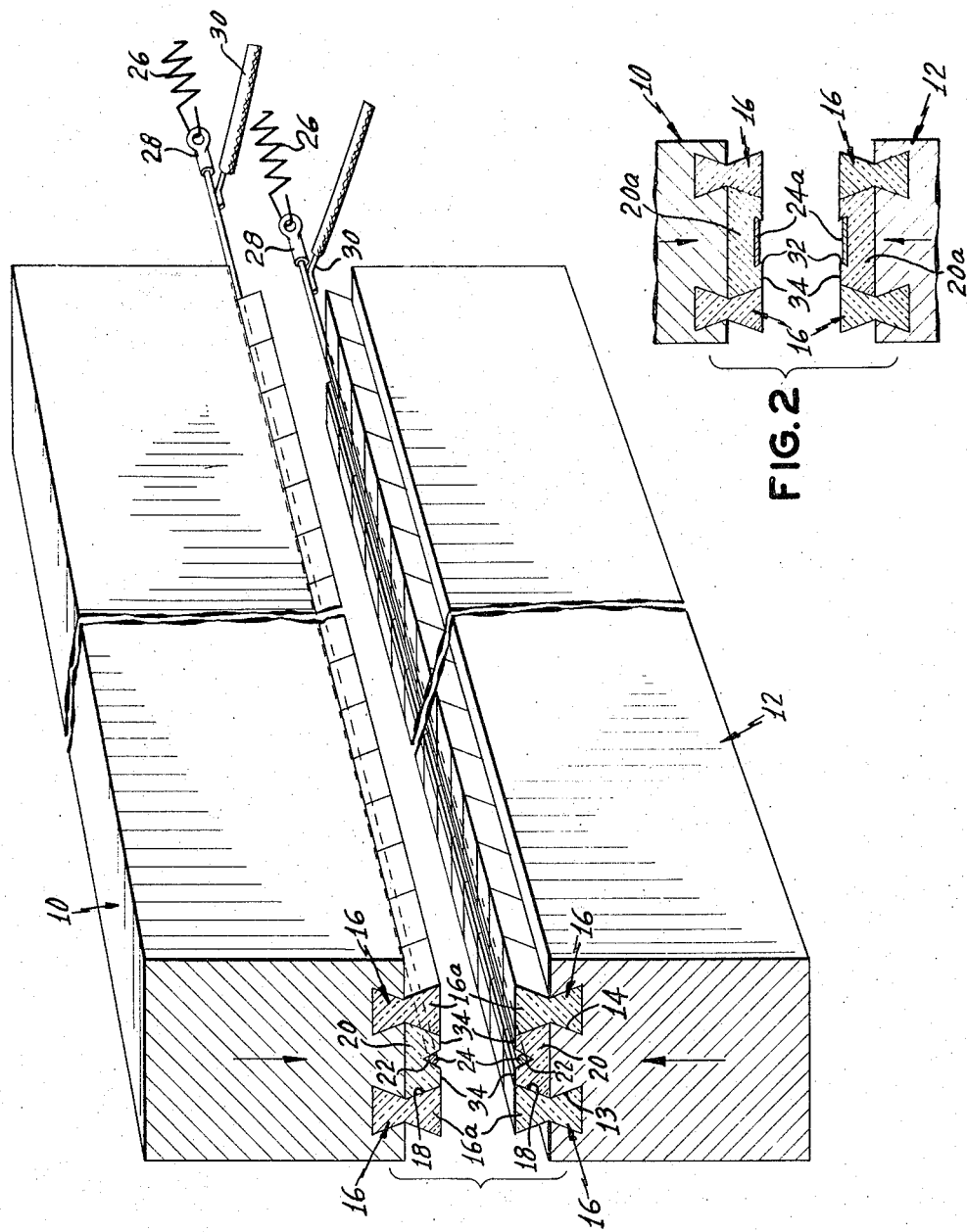

3,291,963
RADIANT HEAT SEALING MEANS
Edward W. Wetzel, Hillside, N.J., assignor to Weldotron Corporation, Newark, N.J., a corporation of New Jersey
Filed Apr. 10, 1964, Ser. No. 358,695
11 Claims. (Cl. 219—243)

This invention relates to heat sealing apparatus, and more particularly to impulse radiant-heat sealing means of improved construction.

One object of the present invention is the provision of improved impulse radiant-heat sealing means, including improved means for clamping the layers of heat sealable material in superimposed relation in the vicinity of the radiant heat sealing member or members.

More specifically stated, an important object of the present invention is to provide clamping means which are more durable than the counter-pressure pads employed in certain radiant-heat sealing techniques.

The invention will be more fully understood from the following description, considered in connection with the accompanying illustrative drawings, in which:

FIG. 1 is a perspective view, partly in section, on an enlarged scale of radiant heat sealing means according to the present invention; and FIG. 2 is a cross-sectional view showing a modification.

In the illustrated presently preferred embodiment of the invention, the heat sealing means comprises the relatively movable bars 10 and 12 of aluminum or other good heat conductive metal. Said bars may be secured in the apparatus and mounted for relative movement toward and away from each other, in any suitable way as will be readily understood by those skilled in the art. Each of said bars is provided in the surface which confronts the companion bar with a pair of laterally spaced longitudinal grooves 13 and 14 which are dovetailed and which have positioned therein a plurality of ceramic members or beads 16, preferably disposed in abutting end-to-end relation in said grooves. Each of said beads has an outwardly projecting portion 16a so that said portions collectively define a longitudinally extending space therebetween on said surface of the bar. The confronting surfaces of portions 16a of the two series of said beads converge in a direction away from said surface of the bar and thereby form a dovetailed groove, as clearly shown by FIG. 1 and there indicated by the numeral 18. A plurality of ceramic beads 20 are disposed in adjacent end-to-end relation in said groove 18, and are retained therein by the projecting portions 16a of the beads in grooves 13 and 14. The beads 20 have grooves at their outer ends and collectively provide a V-shaped groove 22 in which the electrically conducted heat sealing member, here shown as a wire 24, is positioned. The wire 24 is maintained in taut condition when heated as well as when it is cold, this being accomplished by the provision of a tension spring 26 which is connected at one end thereof to one end 28 of the wire 24. The opposite end of the wire may be attached to a fixed part of the apparatus or may be connected to a tension spring in the same way as the connection of end 28 to the spring 26. The opposite ends of the heat sealing member are connected to a source of electric current, one of the end connections being indicated at 30, it being understood that a similar connection is provided at the opposite end of member 24.

The operation of the heat sealing means shown by FIG. 1 is believed to be obvious from the above description. However, it will be understood that the layers of heat-sealable material disposed in superimposed relation between the beads 20 of the upper and lower bars, respectively, so that when the bars 10 and 12 are moved toward each other, said layers of heat-sealable material are clamped between the confronting bead surfaces 34 which are disposed at the opposite sides, respectively, of the companion grooves 22, respectively, of the bars 10 and 12. The heat sealing members 24 are disposed preferably slightly inwardly of the outer surface portions 34 of the beads, but may be flush with said surfaces. When the material is clamped between beads 20 of the two bars and the sealing members 24 are energized, the heat which radiates from said electrically heated members melts the heat-sealable material along the line of said heating members, causing the heat-sealable material to melt and recede to the outer edges of each groove at the surfaces 34, thereby forming a beaded edge along the line or lines at which the layers of heat-sealable material are heat-sealed to each other.

The heat sealing operation is similar to the heat sealing operation of the apparatus shown in the U.S. application of Seymour Zelnick, Serial No. 331,257, filed December 17, 1963, and the present invention may be embodied in a heat sealer of the specific type described therein, it being understood, however, that the heat sealing means of this invention may be employed in heat sealers of other constructions and for other purposes.

It will be understood further that the heat sealing means of the present invention may employ a single heat sealing member 24 which may be carried by either the upper or lower sets of beads 20, in which case the other set of beads 20 will act as a counter-pressure bar for clamping the layers of heat-sealable material. It may be noted that the ceramic beads 16 have relatively low thermal conductivity and are, therefore, considerably cooler than the aluminum bar 10 or 12.

In the form of the invention shown by FIG. 2, the heating elements 24a are in the form of flat bands of high resistance metal and are retained in the dovetailed grooves 32 of the ceramic beads 20a. It will be noted that the electrically energized heat sealing bands 24a are slightly below the clamping surfaces 34 of the beads 22a, so that they do not come in contact with the heat-sealable material during the heat sealing and cutting operation. Except for the provision of the bands 24a instead of the wire 24, as the heat sealing and cutting means, this form of the invention is essentially the same as described above with reference to FIG. 1.

While I have shown and described the presently preferred embodiment of my invention, it will be understood that the invention may be embodied otherwise than as herein specifically illustrated or described and is not to be limited to the hereindescribed specific construction, except as may be required by the scope of the appended claims considered with reference to the prior art.

What is claimed is:

1. Heat sealing means comprising a pair of support members having confronting surfaces and disposed in confronting relation for movement toward and away from each other in said relation each of said support members having laterally spaced holding means on said surface thereof, a series of ceramic members secured to each of said members by said holding means and collectively provided with a longitudinal groove and outer clamping surfaces at opposite sides of said groove extending longitudinally thereof, said groove and said clamping surfaces of one of said series of ceramic members confronting the groove and the clamping surfaces of the other series of ceramic members, and an electrically heated sealing member disposed within one of said grooves, each of said support members having a pair of laterally spaced longitudinally extending dove-tail grooves in said surface thereof, said holding means being secured in said grooves and having outwardly projecting portions engaging said ceramic members for securing them to said support.

2. Heat sealing means comprising a pair of support members having confronting surfaces and disposed in confronting relation for movement toward and away from each other in said relation each of said support members having laterally spaced holding means on said surface thereof, a series of ceramic members secured to each of said members by said holding means, and collectively provided with a longitudinal groove and outer clamping surfaces at opposite sides of said groove extending longitudinally thereof, said groove and said clamping surfaces of one of said series of ceramic members confronting the groove and the clamping surfaces of the other series of ceramic members, and an electrically heated sealing member disposed within one of said grooves, each of said support members having a pair of laterally spaced longitudinally extending dove-tail grooves in said surface thereof, said holding means being secured in said grooves and having outwardly projecting portions engaging said ceramic members for securing them to said support, said holding means comprising a series of ceramic beads secured in each of said dove-tail grooves.

3. Heat sealing means comprising a pair of support members having confronting surfaces and disposed in confronting relation for movement toward and away from each other in said relation each of said support members having laterally spaced holding means on said surface thereof, a series of ceramic members secured to each of said members by said holding means, and collectively provided with a longitudinal groove and outer clamping surfaces at opposite sides of said groove extending longitudinally thereof, said groove and said clamping surfaces of one of said series of ceramic members confronting the groove and the clamping surfaces of the other series of ceramic members, and an electrically heated sealing member disposed within one of said grooves, each of said support members having a pair of laterally spaced longitudinally extending dove-tail grooves in said surface thereof, said holding means being secured in said grooves and having outwardly projecting portions engaging said ceramic members for securing them to said support, said holding means comprising a series of ceramic beads secured in each of said dove-tail grooves, said last-mentioned ceramic beads in the pair of dove-tail grooves having outwardly projecting portions which define a dove-tail groove within which the beads of one of said series is positioned.

4. Heat sealing means comprising a pair of heat conductive support members having confronting surfaces and disposed in confronting relation for movement toward and away from each other in said relation each of said support members having laterally spaced holding means on said surface thereof, a series of ceramic members secured to each of said members by said holding means, and collectively provided with a longitudinal groove and outer clamping surfaces at opposite sides of said groove extending longitudinally thereof, said groove and said clamping surfaces of one of said series of ceramic members confronting the groove and the clamping surfaces of the other series of ceramic members, and an electrically heated sealing member disposed within one of said grooves, each of said support members having a pair of laterally spaced longitudinally extending dove-tail grooves in said surface thereof, said holding means being secured in said grooves and having outwardly projecting portions engaging said ceramic members for securing them to said support, said holding means comprising a series of ceramic beads secured in each of said dove-tail grooves.

5. Heat sealing means comprising a pair of heat conductive support members having confronting surfaces and disposed in confronting relation for movement toward and away from each other in said relation each of said support members having laterally spaced holding means on said surface thereof, a series of ceramic members secured to each of said members by said holding means, and collectively provided with a longitudinal groove and outer clamping surfaces at opposite sides of said groove extending longitudinally thereof, said groove and said clamping surfaces of one of said series of ceramic members confronting the groove and the clamping surfaces of the other series of ceramic members, and an electrically heated sealing member disposed within one of said grooves, each of said support members having a pair of laterally spaced longitudinally extending dove-tail grooves in said surface thereof, said holding means being secured in said grooves and having outwardly projecting portions engaging said ceramic members for securing them to said support, said holding means comprising a series of ceramic beads secured in each of said dove-tail grooves, said last-mentioned ceramic beads in the pair of dove-tail grooves having outwardly projecting portions which define a dove-tail groove within which the beads of one of said series is positioned.

6. Heat sealing apparatus comprising: a pair of support members having respective confronting surfaces and disposed in confronting relation for movement toward and away from each other; one of said support members having two parallel grooves in its confronting surface; two series of rigid, thermally and electrically insulative first members, each member of each series having a portion thereof projecting within a respective one of said grooves, and interlocked therewith against transverse movement relative thereto; said two series of first members forming a third groove; a third series of rigid, thermally and electrically insulative second members, each member having a portion thereof projecting within said third groove, and interlocked therewith against transverse movement relative thereto; said third series of second members forming a fourth groove; and an elongated radiant heating member disposed in said fourth groove.

7. Apparatus according to claim 6 wherein said first three mentioned grooves are dovetail shaped in cross-section.

8. Apparatus according to claim 6 wherein said projective portions of said three series of members are dove-tail shaped in cross-section.

9. Apparatus according to claim 6 wherein both of said support members have respective assemblies of grooves, members and radiant heating members, whereby said radiant heating members are supported in parallel, spaced apart relation, for movement in a common plane.

10. Apparatus according to claim 6 wherein both of said support members have respective assemblies of grooves and members, only one of said assemblies including a radiant heating member.

11. Apparatus according to claim 6 wherein said insulative members are formed of ceramic, and said two series of first insulative members and said one series of second insulative members disposed respectively on each support member provide a coplanar surface remote from said respective support member whereby sheets of film may be clamped between said two coplanar surfaces.

References Cited by the Examiner

UNITED STATES PATENTS

| | | | |
|---|---|---|---|
| 2,481,554 | 9/1949 | Winstead | 219—243 |
| 2,621,704 | 12/1952 | Langer | 219—243 |
| 3,135,077 | 6/1964 | Siegel et al. | 156—515 X |
| 3,234,072 | 2/1966 | Dreeben | 156—583 |

RICHARD M. WOOD, *Primary Examiner.*

C. L. ALBRITTON, *Assistant Examiner.*